(12) United States Patent
Choi et al.

(10) Patent No.: US 10,657,522 B2
(45) Date of Patent: May 19, 2020

(54) APPARATUS AND METHOD FOR PROCESSING CARD APPLICATION IN ELECTRONIC DEVICE

(71) Applicant: Samsung Electronics Co., Ltd., Gyeonggi-do (KR)

(72) Inventors: Byoungkab Choi, Seoul (KR); Jiwoong Byun, Seoul (KR); Seunghwan Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 765 days.

(21) Appl. No.: 14/798,732

(22) Filed: Jul. 14, 2015

(65) Prior Publication Data
US 2016/0027002 A1 Jan. 28, 2016

(30) Foreign Application Priority Data
Jul. 28, 2014 (KR) .......................... 10-2014-0095619

(51) Int. Cl.
*G06Q 40/00* (2012.01)
*G06Q 20/36* (2012.01)
(Continued)

(52) U.S. Cl.
CPC ....... *G06Q 20/367* (2013.01); *G06Q 20/3229* (2013.01); *G06Q 20/382* (2013.01)

(58) Field of Classification Search
CPC . G06Q 20/367; G06Q 20/3229; G06Q 20/382
See application file for complete search history.

(56) References Cited

U.S. PATENT DOCUMENTS 8,706,081 B1 * 4/2014 Paya ................... H04M 1/7253
455/41.1
2008/0147509 A1 6/2008 Ghosh et al.
(Continued)

FOREIGN PATENT DOCUMENTS

KR 10-2006-0125835 A 12/2006
KR 10-0926368 B1 11/2009
KR 10-2014-0112825 A 9/2014

OTHER PUBLICATIONS

"GlobalPlatform Card Contactless Services Card Specification v2.2-Amendment C"; Feb. 2012; GlobalPlatform Inc.

*Primary Examiner* — Rajesh Khattar
(74) *Attorney, Agent, or Firm* — Cha & Reiter, LLC

(57) ABSTRACT

An electronic device and method are disclosed herein. The electronic device includes a communication unit to communicate with an external payment device, a display unit configured to display information for a payment process to the external payment device, and a control unit including an application process module and a secure element module. The secure element module includes one or more electronic cards for performing the payment process through the communication unit, and is configured to update information for the one or more electronic cards in response to an applet update request and generate and transmit an updated applet event to the application process module after updating the information. The application process module is configured to control the display unit to display information for the one or more electronic cards, detect and transmit the applet update request to the secure element module, and update an application in response to receiving the transmitted updated applet event.

20 Claims, 16 Drawing Sheets

(51) Int. Cl.
*G06Q 20/38* (2012.01)
*G06Q 20/32* (2012.01)

(56) References Cited

U.S. PATENT DOCUMENTS

| | | | | |
|---|---|---|---|---|
| 2008/0235796 | A1* | 9/2008 | Buhr | G06F 21/75 |
| | | | | 726/22 |
| 2013/0339166 | A1* | 12/2013 | Baer | G06Q 20/227 |
| | | | | 705/16 |
| 2014/0106670 | A1* | 4/2014 | Gree | H04B 5/0031 |
| | | | | 455/41.1 |
| 2014/0229372 | A1* | 8/2014 | Seo | G06Q 20/341 |
| | | | | 705/41 |
| 2014/0279437 | A1 | 9/2014 | Lee et al. | |
| 2014/0291406 | A1* | 10/2014 | Ko | G06K 19/06206 |
| | | | | 235/492 |
| 2014/0298484 | A1* | 10/2014 | Sung | G06F 21/62 |
| | | | | 726/27 |
| 2014/0324698 | A1* | 10/2014 | Dolcino | G06Q 20/3227 |
| | | | | 705/44 |

* cited by examiner

FIG. 5A

APPARATUS AND METHOD FOR PROCESSING CARD APPLICATION IN ELECTRONIC DEVICE

CLAIM OF PRIORITY

This application claims the benefit under 35 U.S.C. § 119(a) of a Korean patent application filed on Jul. 28, 2014 in the Korean Intellectual Property Office and assigned Serial No. 10-2014-0095619, the entire disclosure of which is hereby incorporated by reference.

TECHNICAL FIELD

The present disclosure relates to an apparatus and method for processing a card application in an electronic device.

BACKGROUND

Modern day electronic devices may include credit card functionality. For payment, such devices may transmit card information to an external device (e.g., a point of sales or "POS" terminal) through contactless communication (e.g., near field communication or "NFC").

Thus, electronic devices may include a plurality of electronic cards, and facilitate operations adding, deleting or selecting one of the electronic cards. Particularly, the electronic device may include an application process or "AP" module and a secure element or "SE" module. The AP module may include applications of card companies, and the SE module may include or store information electronic cards. Together, the AP module and the SE module may perform a payment processing function via communication with external payment devices.

Typically, the AP module is required to retrieve the newest information from the SE module so as to identify a payment priority of applet and a status of applet. However, since the SE module has a relatively slow processing speed in comparison with the AP module, the overall processing performance for applications is often degraded. This may cause difficulty in properly returning the results of processing to a user at a suitable time.

SUMMARY

Accordingly, embodiments of the present disclosure provide an apparatus and method for allowing a secure element module of an electronic device having an electronic payment function to transmit applet information of an application to an application process module in an event. Further provided are an apparatus and method for allowing the application process module to process the applet information received in an event.

Since the application process module receives the applet information from the secure element module in an event, the electronic device can display such information to a user at a suitable time without any system load. Therefore, the user can use means of electronic payment more precisely and conveniently.

According to one embodiment of the invention, an electronic device is disclosed, including a communication unit configured to communicate with an external payment device, a display unit configured to display information for a payment process to the external payment device, and a control unit including an application process module and a secure element module. The secure element module includes one or more electronic cards for performing the payment process through the communication unit, configured to update information for the one or more electronic cards in response to an applet update request and generate and transmit an updated applet event to the application process module after updating the information. The application process module is configured to control the display unit to display information for the one or more electronic cards, detect and transmit the applet update request to the secure element module, and update an application in response to receiving the transmitted updated applet event.

According to one embodiment of the invention, a method for processing payment in an electronic device is disclosed, including transmitting, via an application process module of the electronic device, an applet update request for at least one electronic card to a secure element module including the at least one electronic card, updating, via the secure element module of the electronic device, an applet corresponding to the at least one electronic card and generating and transmitting an updated applet event to the application process module after updating the applet, updating, via the application process module, an application associated with the updated applet in response to receiving the updated applet event, and executing, via the secure element module, a payment process to an external payment device through a communication unit of the electronic device with an external payment device.

BRIEF DESCRIPTION OF THE DRAWINGS

FIG. 5A illustrates an example payment card list displayed on an electronic device and FIG. 5B shows detailed information about a selected card.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as mere examples. Accordingly, those of ordinary skill in the art will recognize that various changes and modifications of the embodiments described herein can be made without departing from the present disclosure. In addition, descriptions of well-known functions and implementations may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

The electronic device disclosed herein includes a secure element (SE) module embedded therein and is used for a wireless payment system either online or offline. The SE module supports EMV which stands for Europay, MasterCard and Visa. EMV is a global standard for inter-operation of integrated circuit cards (IC cards or "chip cards") and IC card capable point of sale (POS) terminals and automated teller machines (ATMs), for authenticating credit and debit card transactions. The electronic device may update information about a contactless registry service (CRS) applet and/or a card applet installed in the SE module and also transfer updated information to an application (e.g., a bank and/or card company application) running in an application process (AP) module through a host controller interface (HCI) event. Therefore, without a periodic access to the SE module, the AP module can ascertain updated information at an update time point of applet information through the HCI event transmitted from the SE module.

Figure 1:
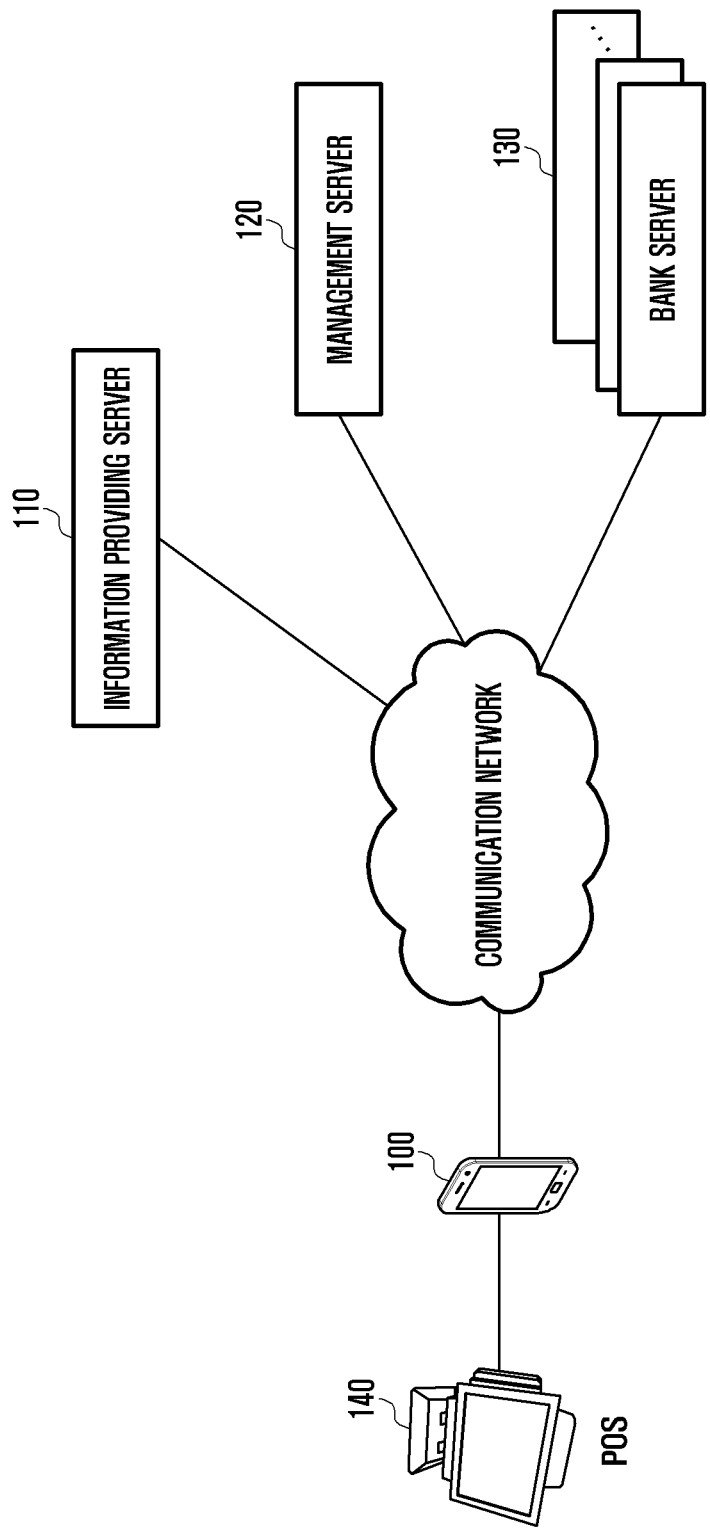
FIG. 1 is a schematic diagram illustrating an example wireless payment system in accordance with various embodiments of the present disclosure.

FIG. 1 is a schematic diagram illustrating a wireless payment system in accordance with various embodiments of the present disclosure.

Referring to FIG. 1, an electronic device 100 may communicate payment information by establishing a communication link with an external payment device 140 (e.g., a POS terminal) in a contactless manner. Additionally, the electronic device 100 may be connected with servers 110, 120 and 130 in a wireless system through a communication network. An information providing server 110 interoperates with the electronic device 100 and may provide card information of each bank/card company. A management server 120 may manage access authority for applets in the electronic device 100 and also remotely manage and distribute a contactless communication application of the electronic device. A bank server 130 is a server of a bank or card company and may offer the installation of an electronic card and personal card information by interoperating with the electronic device 100.

Figure 2:
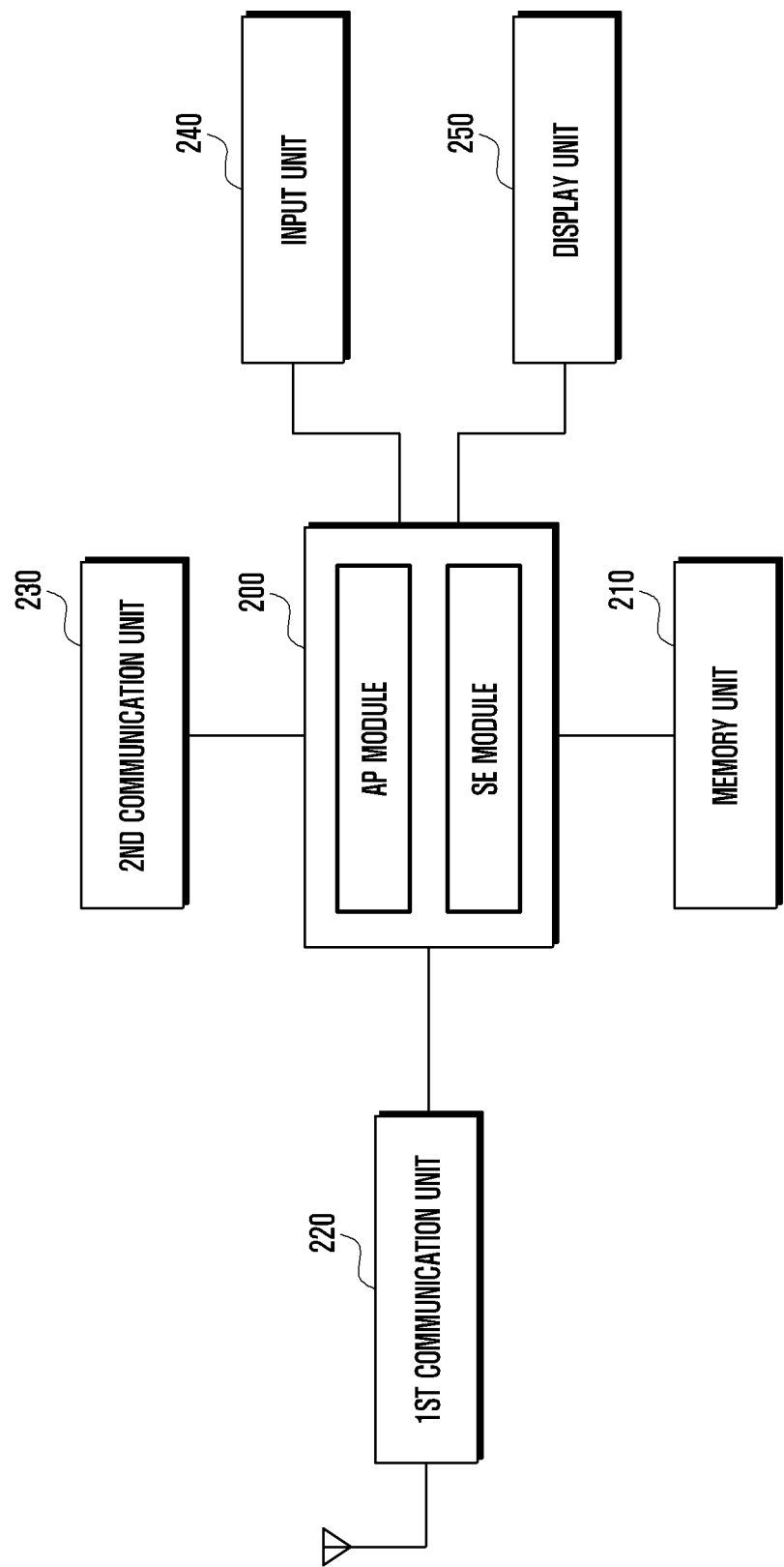
FIG. 2 is a block diagram illustrating an electronic device having an example wireless payment function in accordance with various embodiments of the present disclosure.

FIG. 2 is a block diagram illustrating an electronic device having a wireless payment function in accordance with various embodiments of the present disclosure. The electronic device may be a mobile phone, a smart phone, an MP3 player, a tablet PC, a desktop computer, a notebook, a digital camera, or any other portable, mobile or stationary digital device.

Referring to FIG. 2, a communication unit may be connected with the external payment device 140 and the above-mentioned servers through the communication network. The first communication unit 220 may perform a wireless communication function with the servers or the like through the communication network. The first communication unit 220 may be configured for LTE, WCDMA, CDMA or GSM. Also, the first communication unit 220 may be available for WIFI or WIMAX. The second communication unit 230 may establish a communication link with the external payment device 140 in a contactless manner. The second communication unit 230 may be configured for a short range communication device such as NFC.

The control unit 200 may control the overall operation of the electronic device. Additionally, the control unit 200 may process an electronic payment application function by including therein the AP module and the SE module. When an electronic payment application (e.g., a bank application) updates applets in the SE module, the control unit 200 may transfer an event regarding updated matters to the application and other associated applications in the AP module. Therefore, the control unit 200 may offer, through electronic payment applications, information associated with electronic payment to a user at a suitable time by using updated applet information in the SE module.

The memory unit 210 may include a program memory and a data memory. The program memory may store therein an operating system of the device and various programs associated with, for example, embodiments of this disclosure. The data memory may store therein tables used for the operation of the device and data created during the execution of such programs.

The input unit 240 may create an input signal for processing an electronic payment application function. The input unit 240 may be a touch panel for detecting a finger touch and/or hovering. Also, the input unit 240 may further include an EMR sensor pad for detecting a pen touch and/or hovering. The display unit 250 may display thereon electronic payment applications and related data, e.g., updated or processed data of such applications, under the control of the control unit 200. The display unit 250 may be formed of LCD, OLED, or the like. The input unit 240 and the display unit 250 may be integrated with each other.

For contactless payment based on the EMV standard, the electronic device may include the AP module and the SE module embedded therein, install applets supporting the GlobalPlatform standard in the SE module, and perform payment with an external payment device (e.g., a POS terminal) through the second communication unit 230 (e.g., an NFC communication unit).

GlobalPlatform (hereinafter, referred to as "GP") standards may be utilized with the present disclosure, such as the GlobalPlatform Card Specification v2.2.1. The GP standard may be used, in some embodiments, to help define the definition and scope of a Contactless Registry Service, or "CRS" application, which is an optional component for management of Contactless Applications by the end user. The CRS Application is responsible for facilitating retrieval of a list of all Application Groups and Standalone Applications, and to activate, deactivate, or change the Priority or Volatile Priority of these entities on the contactless interface.

Electronic payment using a wireless payment system may be based on the GP specification. Therefore, an application (e.g., a bank application and/or a card company application) running in the AP module may retrieve an applet installed in the SE module and a status of the applet through a CRS, recognize a current status, and perform one or more relevant operations (e.g., activation, deactivation, etc.).

According to the electronic payment method of the electronic device, a default electronic payment application may be set from among at least one electronic payment application. Then activating means of payment in the default electronic payment application, electronic payment may be performed.

Additionally, the electronic device may include a payment module for providing an electronic payment function, and a control module for setting a default electronic payment application from among at least one electronic payment application and for performing electronic payment by activating means of payment in the default electronic payment application. Also, the control module may transfer a variation in status of a payment module for offering an electronic payment function to at least one electronic payment application.

Figure 3:
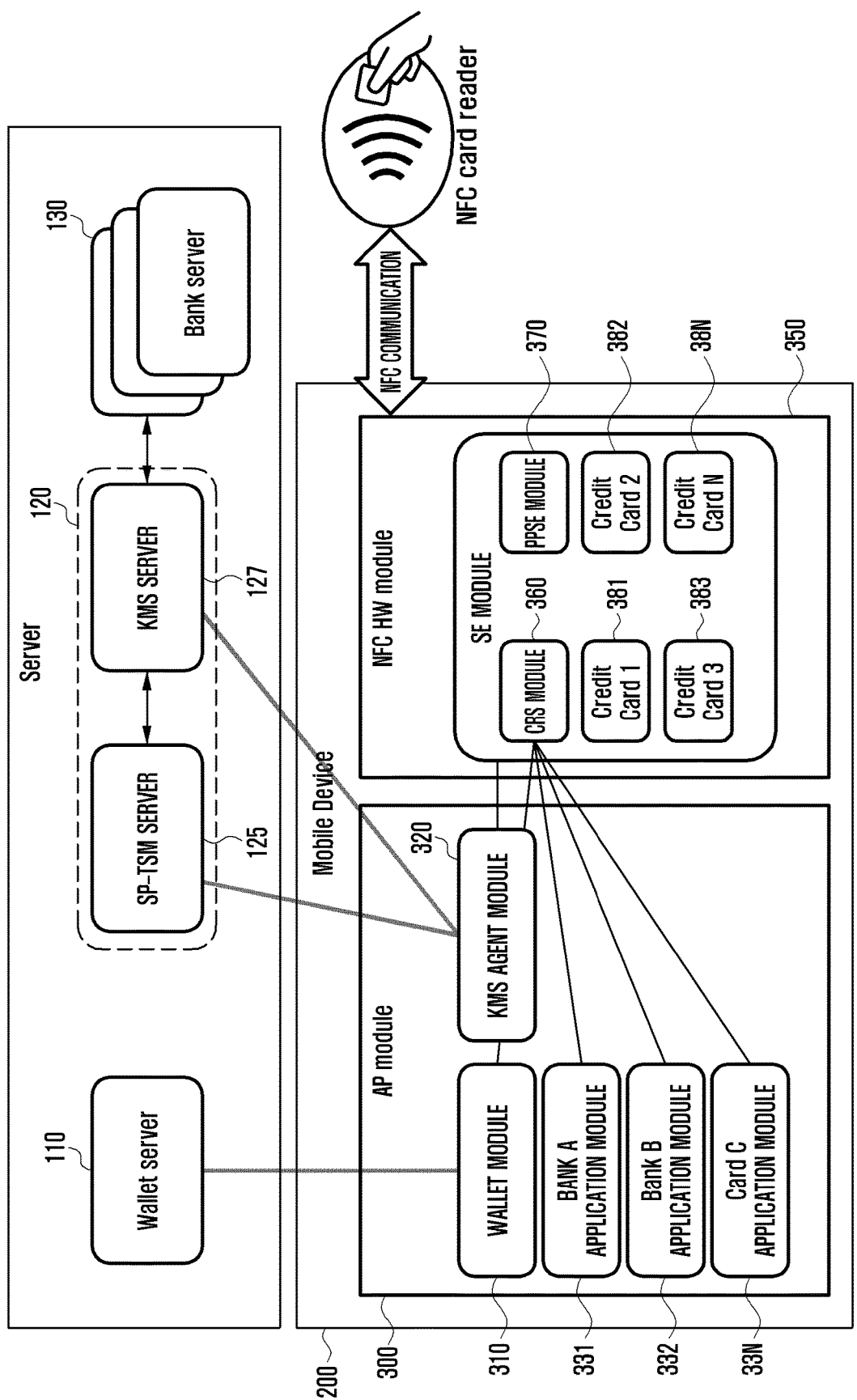
FIG. 3 is a block diagram illustrating a detailed configuration of an example AP module and an example SE module in an electronic device.

FIG. 3 is a block diagram illustrating a detailed configuration of an AP module and an SE module in an electronic device. The AP module 300 controls the update of applet in the SE module 350 and may establish a communication link with external servers through the communication network. The SE module 350 includes therein at least one electronic card and may communicate payment information with the POS terminal 140 through the second communication unit 230.

Referring to FIG. 3, the AP module 300 may be connected with the communication network through the first communication 220 and may establish a communication link with external servers such as the information providing server 110 (referred to in this example as a "wallet server"), the management server 120, and the bank server 130. The wallet server 110 interoperates with the AP module 300 and performs a function of providing card information for each relevant bank/card company. The management server 120 may include a service provider trusted service manager ("SP-TSM") server 125 and a key management system ("KMS") server 127 therein. The SP-TSM server 125 is one component of a NFC ecosystem and may perform a function of remotely managing and distributing a contactless communication application in the SE module 350. The KMS server 127 may perform a function of managing access authority for applets in the SE module 350. The bank server 130 interoperates with a bank application in the AP module 300 and may provide a card installation and personal card information.

The AP module 300 may be composed of a wallet module 310, a KMS agent module 320, and one or more bank applications 331-33N. For example, FIG. 3 shows three bank applications. The AP module 300 may have an operating system (OS) mounted therein. This OS which is experienced by a user in the electronic device may be Android, Windows, or the like.

The wallet module 310 is an electronic wallet application that interoperates with the wallet server 110. The wallet module 310 may perform a function of showing information of electronic cards in the SE module 350 to users and also supporting a selection of a specific card to be used. The bank applications 331-33N are applications of banks and/or card companies and may offer a function of installing and/or deleting an electronic card in the SE module 350 and also setting a default card and/or a temporary card. The KMS agent module 320 is installed in the AP module 300 and may perform the operation of the SE module 350 by downloading a desired function from the management server 120. Namely, the KMS agent module 320 may manage the authority of the SE module 350 to access applets and also manage and control contactless communication of electronic cards in the SE module 350.

The SE module 350 may include therein a contactless registry service (CRS) module 360, a proximity payment system environment (PPSE) module 370, and one or more electronic cards 371-37N. For example, FIG. 3 shows four electronic cards. The SE module 350 is an embedded secure element in the electronic device 100, has its own OS, and may store Java applet to perform a payment function. The SE module 350 may perform payment by directly communicating with an external payment device (e.g., an NFC card reader) through the second communication unit 230 (e.g., the NFC communication unit).

The CRS module 360 may be applet that runs in the SE module 350. The CRS module 360 is a customized applet according to the global platform specification, manages user's manipulation of contactless applet, and may perform an interface function of controlling the activation/deactivation or priority of applets. The PPSE module 370 may be applet located in the SE module 350. The PPSE module 370 manages applets of electronic cards 381-38N in the SE module 350 and may perform a function of communicating with the external payment device 140, e.g., a card reader, and thereby communicating information of electronic card available for the card reader. The electronic cards 381 to 38N are credit or debit card applets containing information issued by banks and/or card companies and may include personal card information.

The external payment device 140, namely the POS terminal, may be an NFC card reader and may read and process the electronic cards in the SE module 350 in contactless manner.

Figure 4:
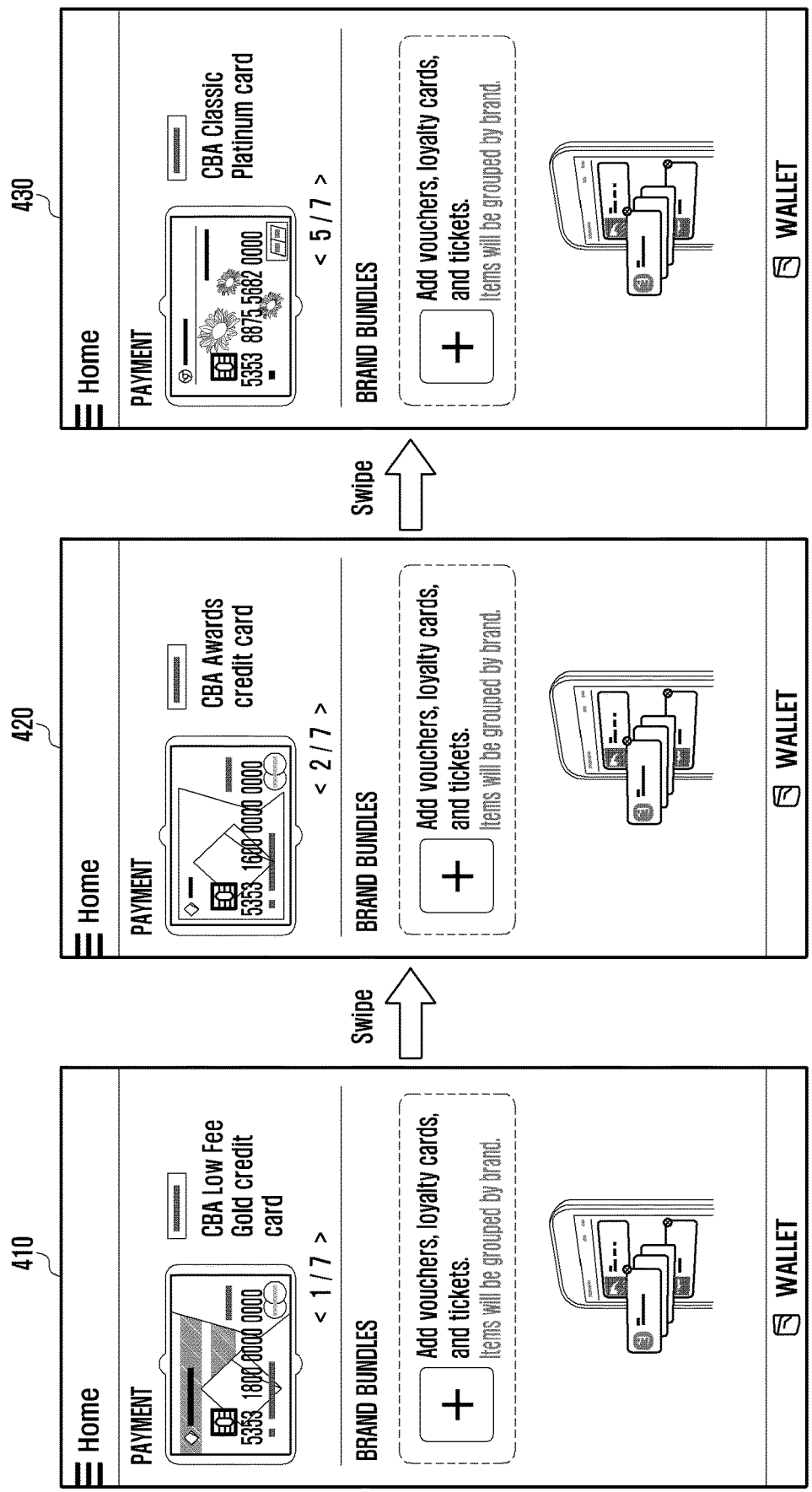
FIG. 4 illustrates example wallet home screens displayed on an electronic device.

FIG. 4 shows example wallet home screens displayed on an electronic device.

Referring to FIG. 4, when a user selects a home screen through the input unit 240, the control unit 200 may display a wallet home screen on the display unit 250 as indicated by a reference number 410. Then, in response to a swipe input through the input unit 240, the control unit 200 may change the home screen with another card as indicated by reference numbers 420 and 430. This change of the home screen may be executed by the AP module 300 of the control unit 200, and this may be controlled by the wallet module 310 of the AP module 300.

Figure 5A:
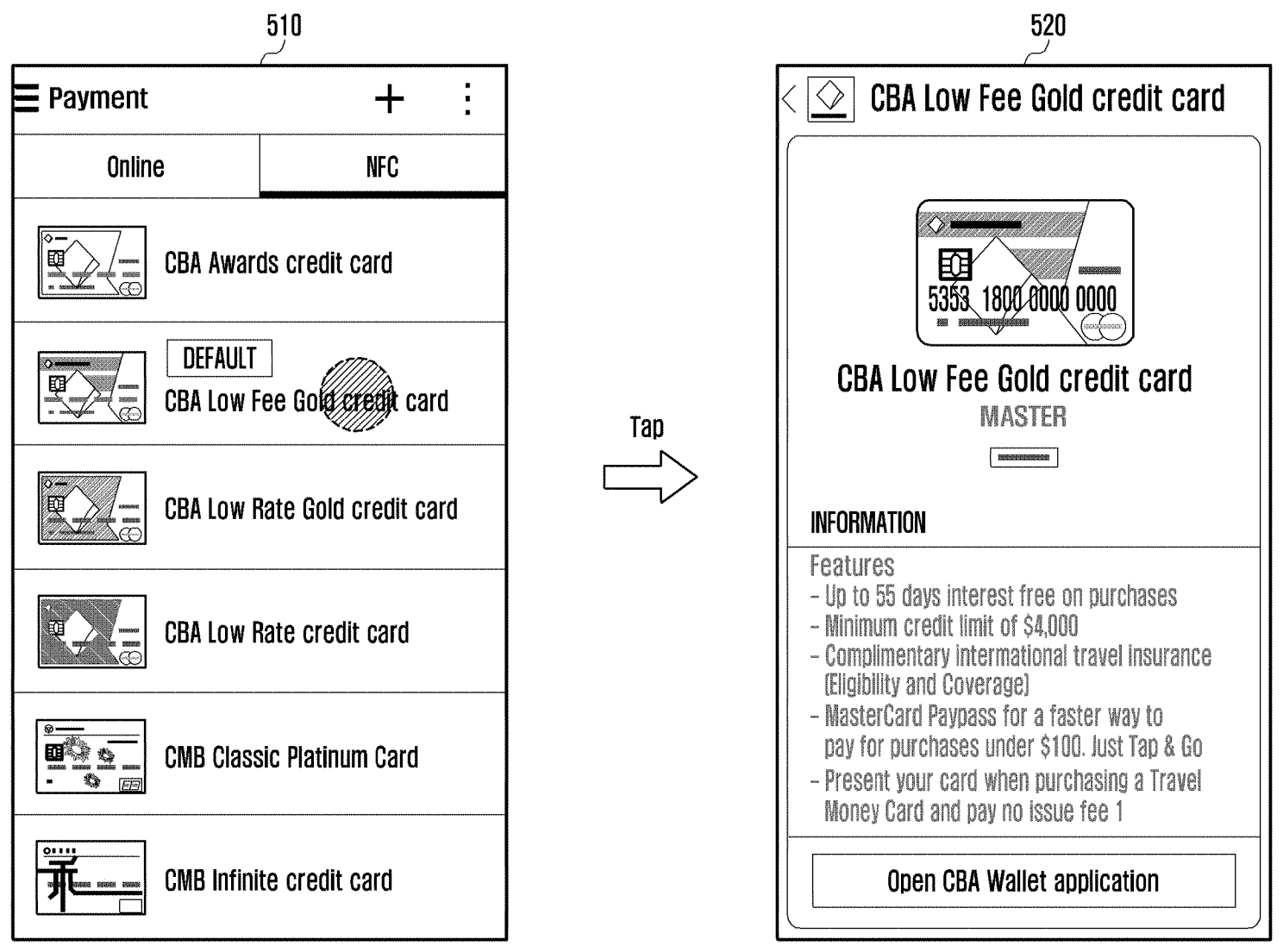
Figure 5B:
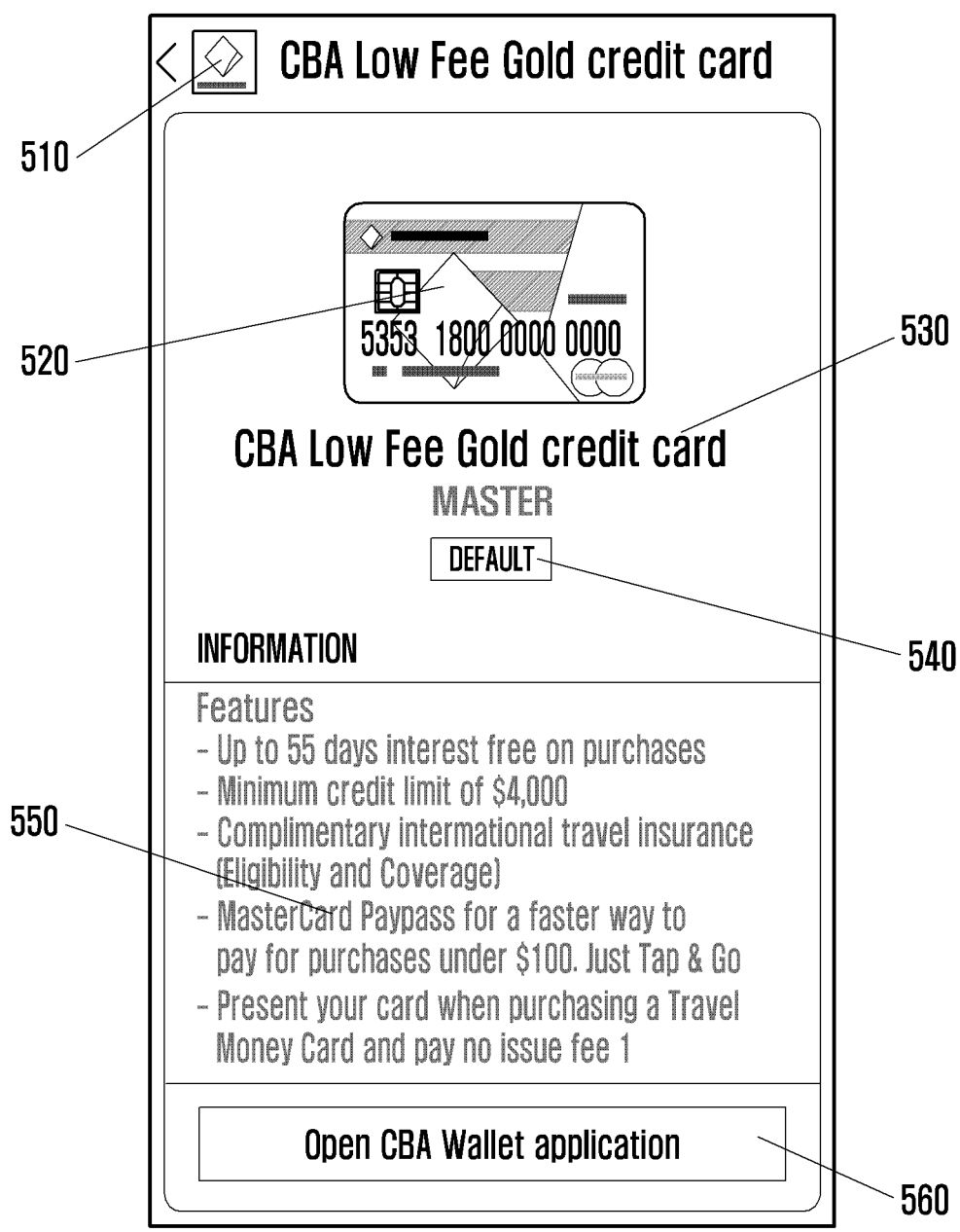

FIG. 5A shows an example of a payment card list displayed on an electronic device and FIG. 5B shows detailed information about a selected card.

Referring to FIG. 5A, when a payment card list is selected, the control unit 200 may display the payment card list on the display unit 250 as indicated by a reference number 510. Then, if a specific card is selected from the card list, detailed information about the selected card may be displayed as indicated by a reference number 520.

FIG. 5B shows case in which the selected card is a main or default payment card. Referring to FIG. 5B, a card status screen may be formed of, for example, a bank logo 510, a card image 520, a card name or type 530, a default card mark 540, detailed information 550 about the selected card, a link 560 of a bank application.

FIGS. 6A to 6D are screenshots illustrating example operations of setting a default payment card in an electronic device.

Referring to FIGS. 6A to 6D, the electronic having an electronic card payment function may perform the payment function with a preset card. Namely, two or more electronic cards may exist in the SE module 350, and therefore a specific card to perform the payment function should be set. A user can set a frequently used card as a default payment card.

Figure 6A:
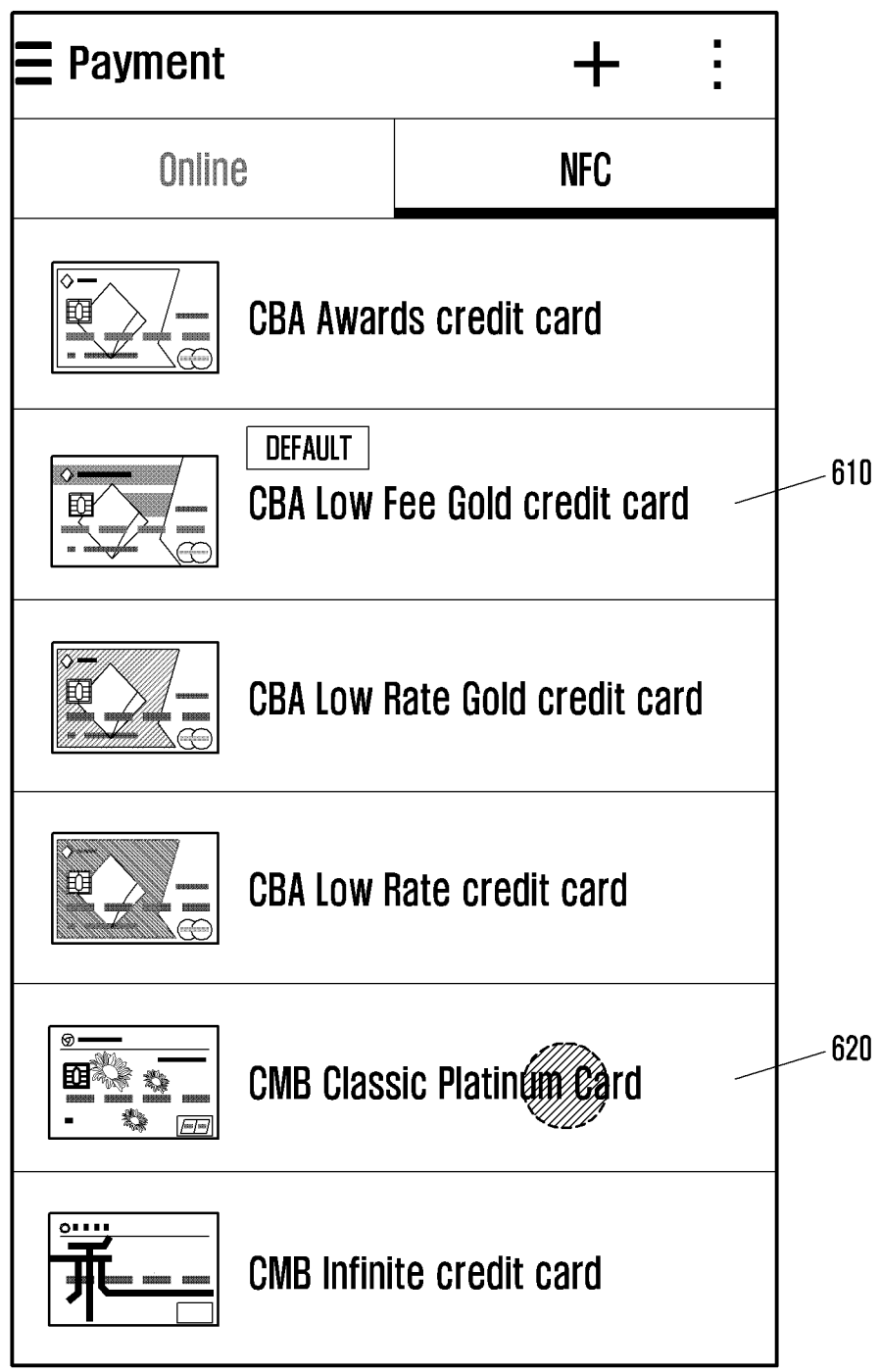
FIG. 6A, FIG. 6B, FIG. 6C and FIG. 6D illustrate example operations of setting a default payment card in an electronic device.

As shown in FIG. 6A, a payment card list may contain a currently set default payment card 610 and the other cards.

Figure 6B:
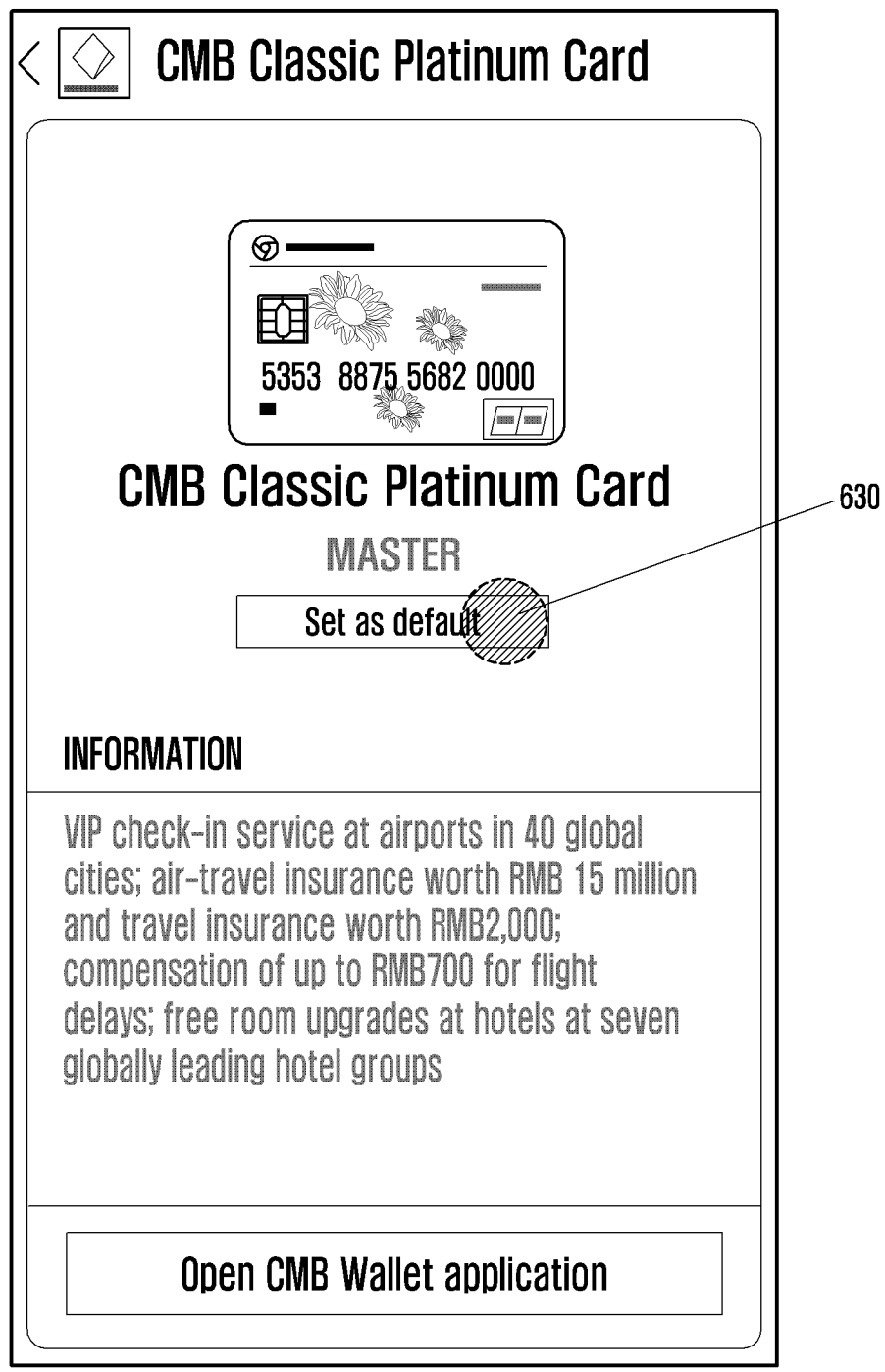
Figure 6C:
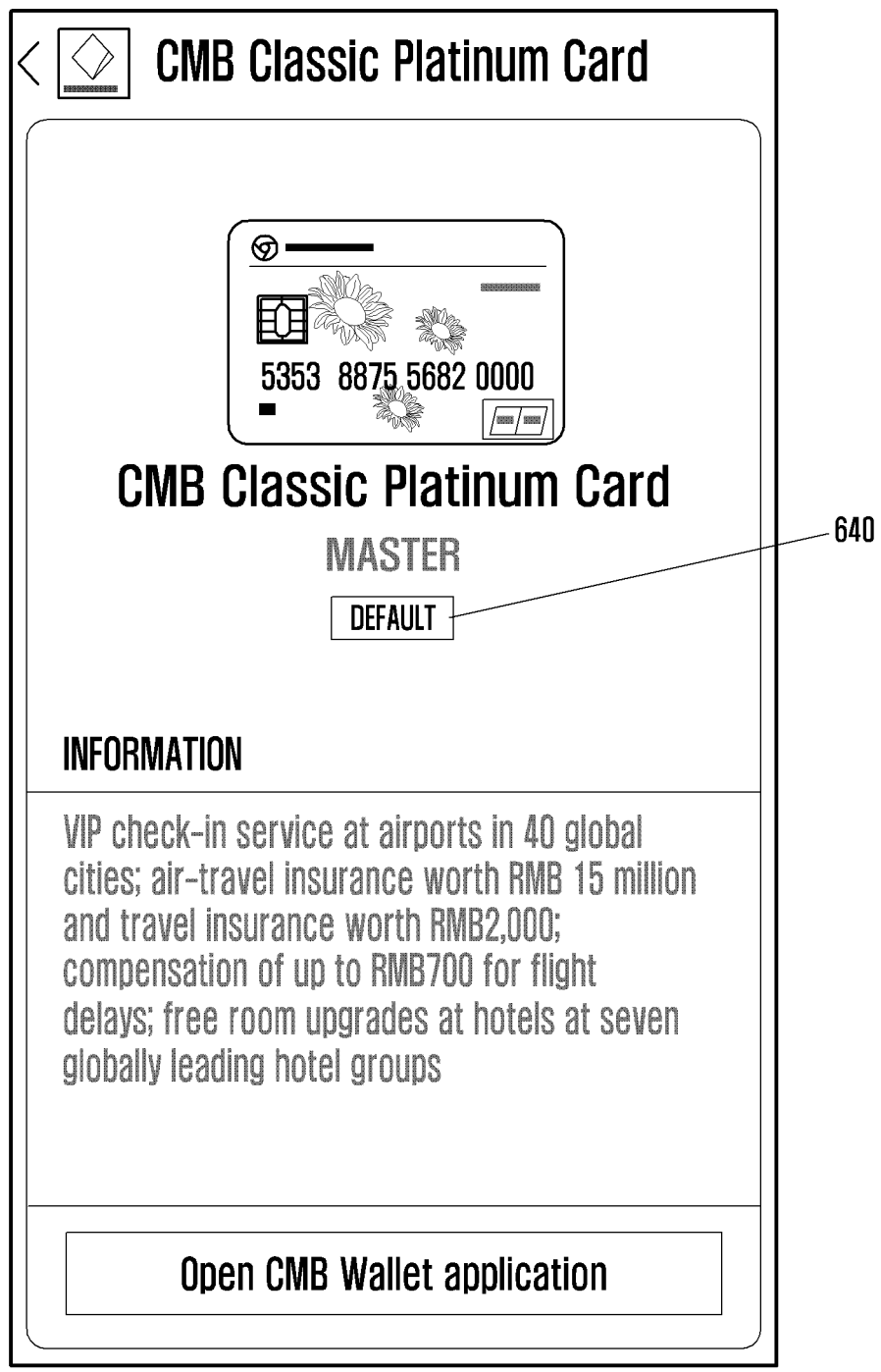
Figure 6D:
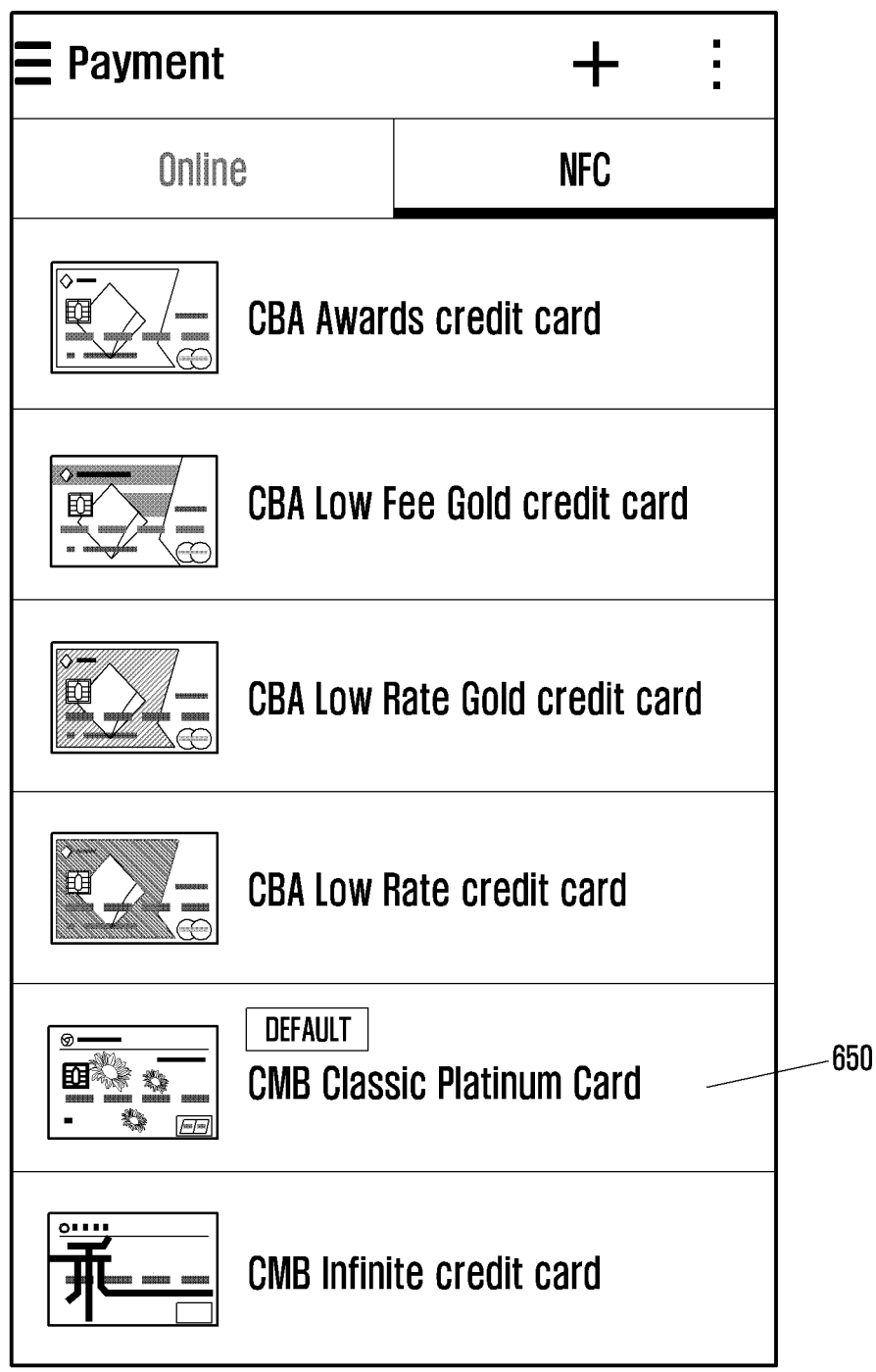

If a user selects a certain card 620 other than the default payment card in the payment card list, the control unit 200 may display a detailed screen of the selected card as shown in FIG. 6B. Such a detailed screen may display an item 630 (represented as "set as default") for setting a current card as a default card. If this item 630 is selected, the control unit 200 may display, as shown in FIG. 6C, another item 640 (represented as "default") for indicating that a current card is set as a default card. Also, as shown in FIG. 6D, the control unit 200 may display the newly set default payment card 650 in the payment card list.

As discussed above, the AP module 300 may set card information and cards in the SE module 350.

At this time, the bank application modules 331-33N may perform the following operations, including an operation to install an electronic card (i.e., a payment card) in the SE module 350 and put information in the electronic card (i.e., personalization), deleting the electronic card from the SE module 350, setting a default payment card to be used at payment, setting a default wallet to be used at payment, and temporarily setting a desired payment card other than the default payment card.

Additionally, the wallet module 310 may perform operations, including setting a default payment card to be used at payment, setting a default wallet to be used at payment, and temporarily setting a desired payment card other than the default payment card.

If a card status is updated in the bank applications 331-33N, the wallet module 310 receives update information from the CRS module 360 of the SE module 350 in the form of event (i.e., HCI event). Then, in response to the received HCI event, the wallet module 310 updates a user interface (UI) according to the updated status. Such update operations may include installation of a card, deletion of a card, setting of a default card, setting of a temporary card, setting of a default wallet, and the like.

When a request for updating information is received from the AP module 300, the SE module 350 performs an update of applet information. Then the CRS module 360 of the SE module 350 may create an HCI event message containing updated matters and transfer the created event message to the AP module 300. This event transfer method of the CRS module 360 may be a method for inserting and transferring relevant information in EVT_TRANSACTION having parameters among HCI events transferred to a contactless front-end (CLF), based on ETSI TS 102 622 Specification. This message transmitted in an event driving manner may have a structure shown in Table 1.

TABLE 1

| tag | length | description | | | |
|---|---|---|---|---|---|
| 81 | 5-16 | AID | | | |
| | | | tag | length | Description |
| 82 | 0-65535 | SW1, SW2, . . . | 7E99 | var | "Package Name String" |
| | | | 4F | 5-16 | "Card Application AID of related with EVT_TRANSACTION event" |

The message of Table 1 may record, in parameters part, a status word capable of expressing n statuses through a bit calculation, and information corresponding to the status word. Thus, the CRS module 360 may transfer EVT_TRANSACTION, formed as shown in Table 1, to the AP module 300 through an HCI event whenever a status is changed. Therefore, the AP module 300 may not be required to check a status of the SE module 350 in a polling manner so as to update applet information in the SE module 350. Namely, the CRS module 360 of the SE module 350 can transfer an update status of the SE module 350 in an event, and also the AP module 300 can ascertain an applet update of the SE module 350 by checking the received event and then process a related operation. This operation may include software secure elements as well as hardware secure elements.

Figure 7:
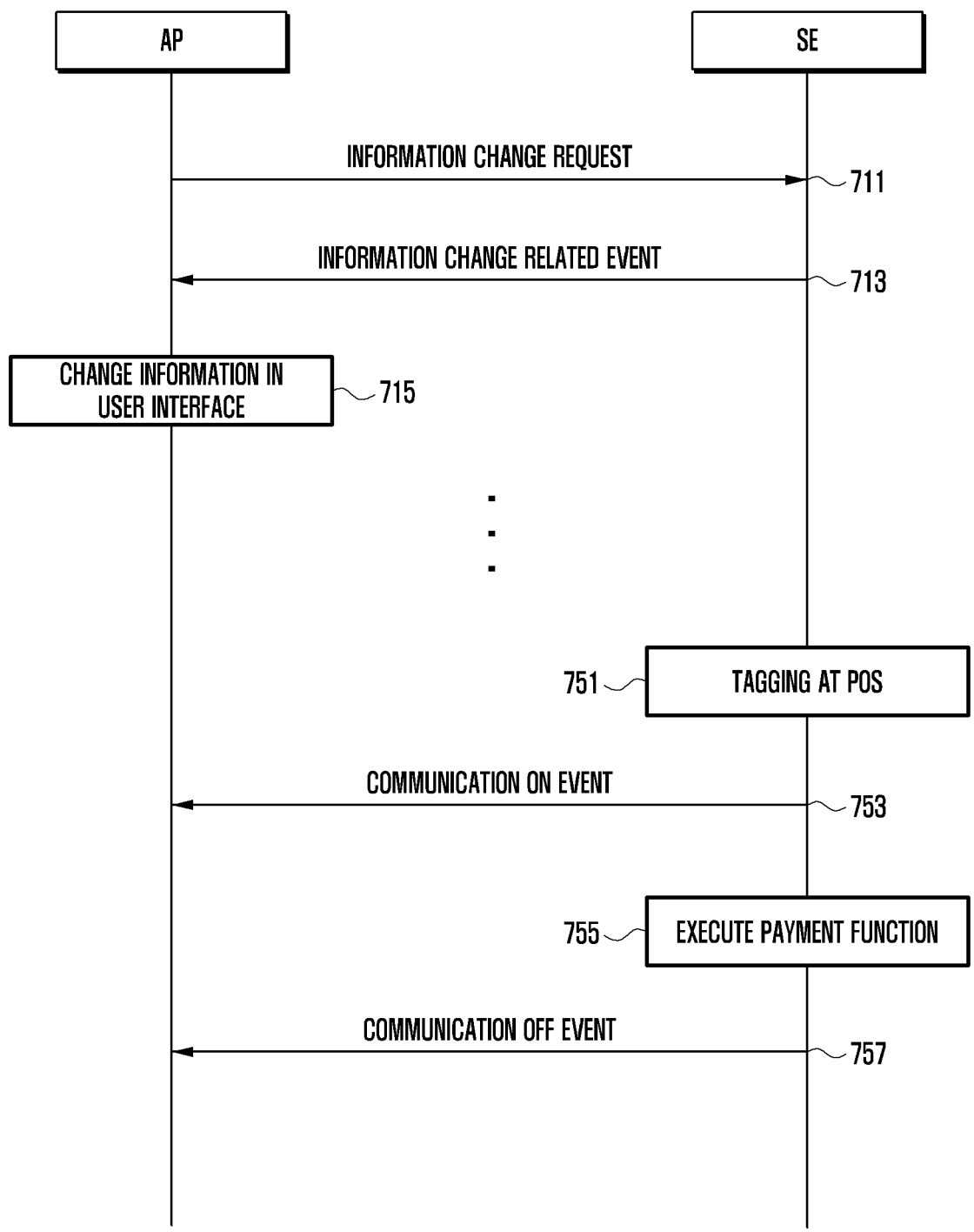
FIG. 7 is a flow diagram illustrating an operation procedure of an electronic device having an electronic payment function.

FIG. 7 is a flow diagram illustrating an example operation procedure of an electronic device having an electronic payment function.

Referring to FIG. 7, if there is a request for updating information, the AP module 300 transfers it to the SE module 350 at operation 711. Then the SE module 350 executes update of corresponding applet, creates an HCI event of execution results, and transfers it to the AP module 300 at operation 713. Then the AP module 300 can update a user interface of a related application at operation 715. Here, the update of applet may include installation of a card, deletion of a card, setting of a default card, setting of a temporary card, setting of a default wallet, and the like.

For example, if a user requests the installation or deletion of a specific card through the input unit 240, the AP module 300 requests an external server to install or delete the specific card in or from the SE module 350. Also, the AP module 300 commands the SE module 350 to update (install or delete) corresponding applet. Then the SE module 350 executes update of corresponding applet and transfers execution results to the AP module 300 in an HCI event. At this time, the HCI event message may have a structure as shown in Table 1 and contain status information of updated applet in the SE module 350. Then the AP module 300 can update a user interface of updated applet in response to the HCI event message.

If applet update is installation or deletion, the AP module 300 may request the SE module 350 to install or delete a card. Then the SE module 350 may install or delete a corresponding card and transfer an HCI event of processing results to the AP module 300. When the HCI event is received, the AP module 300 may update a user interface of a corresponding application.

The above-mentioned operation of a request for installation or deletion may be performed through an external server. For example, the AP module 300 may send a request for installation or deletion of applet in the SE module 350 to the KMS server 127, receive an installation or deletion command from the KMS server, and request the SE module 350 to install or delete applet.

Meanwhile, if an HCI event associated with installation or deletion is received, the AP module 300 may request the wallet server to match card information and then update a user interface of a corresponding application when a matching result is received from the wallet server.

Additionally, a user can change a specific card as a default payment card through the input unit 240. Then the AP module 300 commands the SE module 350 to change the applet. Therefore, the SE module 350 executes a change of the default payment card and transfer execution results to the AP module 300 in an HCI event. Here, an HCI event message may contain information associated a change of the default payment card. Then the AP module 300 may change a user interface of applet in response to the HCI event message.

If an applet update is setting of a default card, the AP module 300 may request the SE module 350 to set a default card. Then the SE module 350 may set a selected card as a default card and transfer a default card setting HCI event to the AP module 300. In response to this HCI event, the AP module 300 may update a user interface of an application of a corresponding card.

As shown in FIGS. 6A to 6D, in order to set a default payment card, the AP module 300 may display a list of payment cards including a default card on the display unit 250. If a user selects a certain card other than the default card from the payment card list through the input unit 240, the AP module 300 may request the SE module 350 to set the selected card as the default card.

Returning to FIG. 7, the electronic device 100 may be tagged on the external payment device 140 at operation 751. Then the SE module 350 may perform a payment function through a short range communication link. Namely, when tagging is detected, the SE module 350 establishes a communication link in a contactless manner and an HCI event message to the AP module 300 at operation 753. Also, at operation 755, the SE module 350 communicates data for processing a payment function to the external payment device 140 (i.e., the POS terminal, the NFC card reader) through a communication link (e.g., the NFC link). If a payment operation is finished, the SE module 350 releases a communication link with the external payment device 140 and transfers an HCI event associated with the release of the communication link to the AP module 300 at operation 757.

Figure 8:
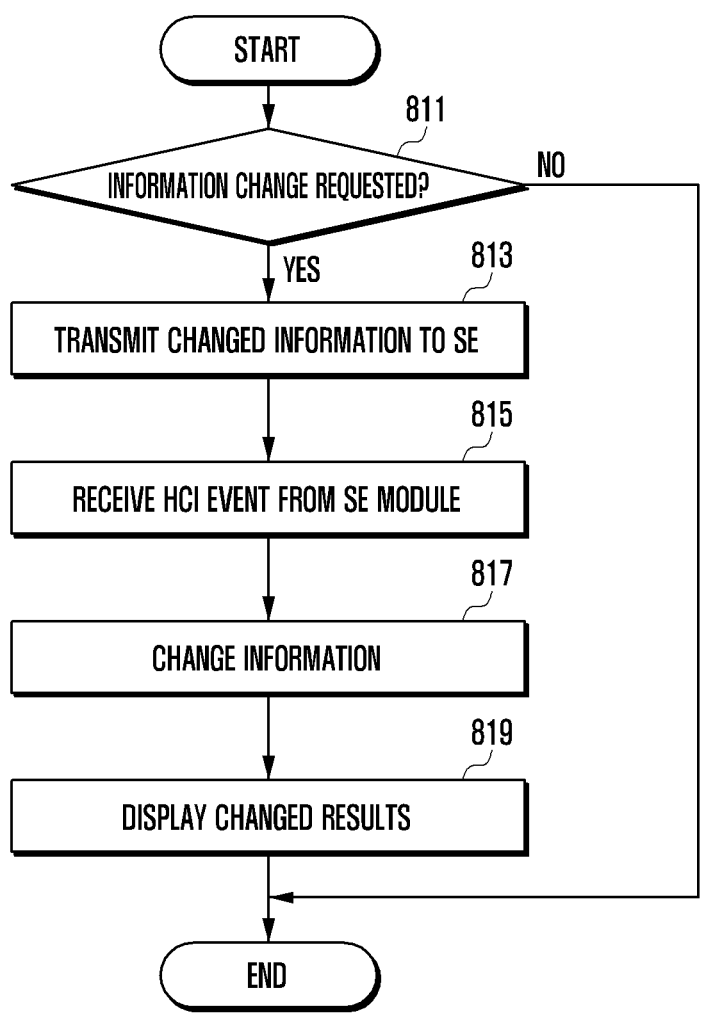
FIG. 8 is a flow diagram illustrating an example operation procedure of an AP module in an electronic device.

FIG. 8 is a flow diagram illustrating an example operation procedure of an AP module in an electronic device.

Referring to FIG. 8, if there is a request for updating information through the input unit 240, the AP module 300 detects the request at operation 811 and transfers applet update information to the SE module 350 at operation 813. If a request for updating information is to install or delete a payment card, the AP module 300 may establish a communication link with an external server through the first communication unit 220, send such an update request to the server, receive a command regarding the update request from the server, and transfer the command to the SE module 350. However, if such a request is to set a default card or wallet, the AP module 300 may directly transfer the request to the SE module 350 without any communication with the external server.

Thereafter, if an HCI event containing update results is received from the SE module 350, the AP module 300 may detect it at operation 815. Further, the AP module 300 may update a user interface by analyzing the received HCI event at operation 817 and display update results on the display unit 250 based on the analysis at operation 819. As discussed above, the AP module 300 does not performs an operation of checking the status of the SE module 350 to update applet in the SE module 350, and instead performs an update procedure for corresponding applet when the SE module 350 transfers an HCI event.

Figure 9:
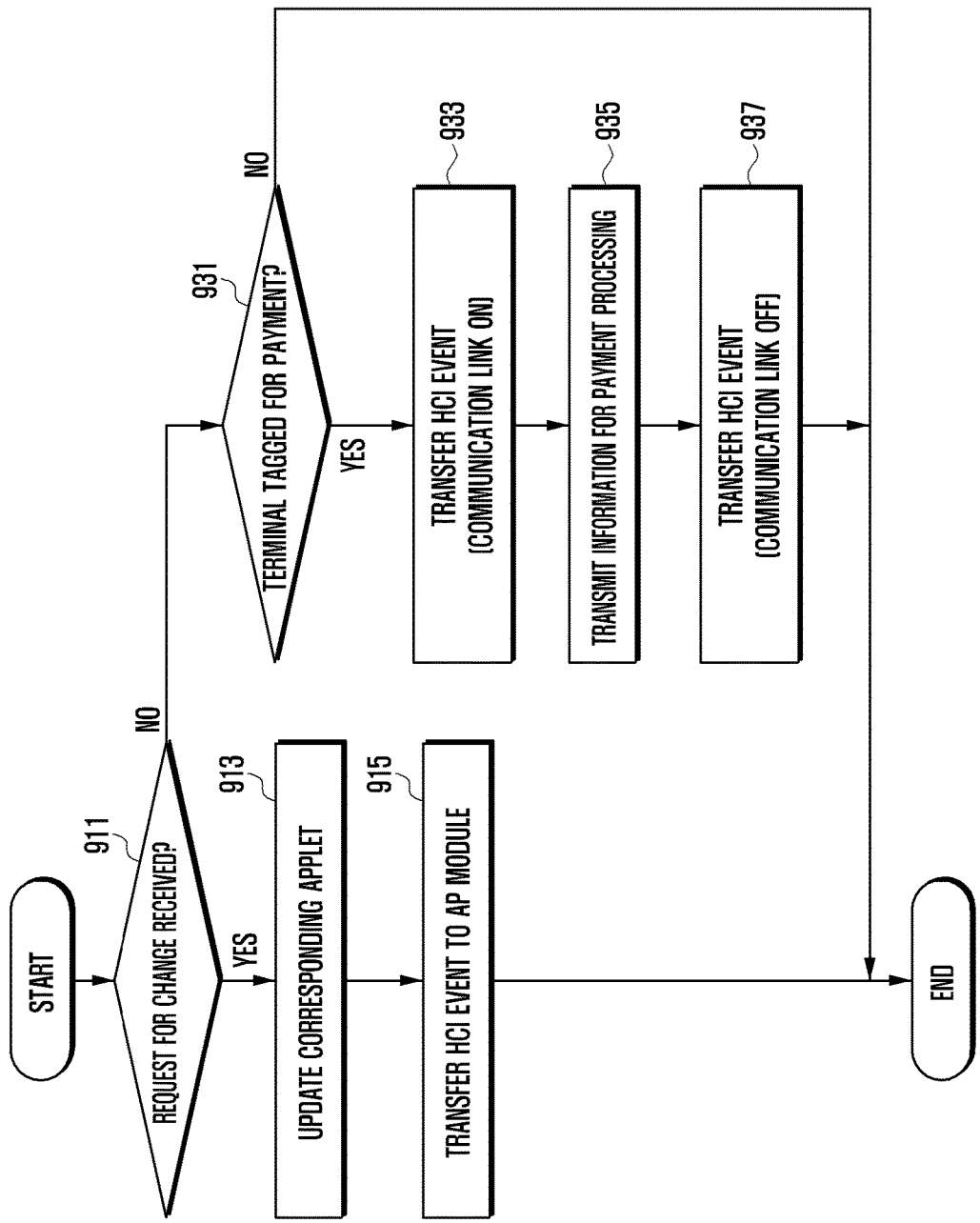
FIG. 9 is a flow diagram illustrating an example operation procedure of an SE module in an electronic device.

FIG. 9 is a flow diagram illustrating an example operation procedure of an SE module in an electronic device.

Referring to FIG. 9, when a request for updating information is received from the AP module 300, the SE module 350 may detect it at operation 911 and update a corresponding applet at operation 913. Also, at operation 915, the SE module 350 creates an HCI event message including status information associated with updated applet and to transfers it to the AP module 300.

Additionally, when the electronic device 100 is tagged on an external payment device 140 (e.g., such as by NFC-enabled contact with a POS terminal), the SE module 350 may perform a payment function by establishing a short range communication link. Namely, when tagging is detected, the SE module 350 detects it at operation 931 and establishes a communication link in a contactless manner. Then the SE module 350 creates a communication link ON (e.g., NFC field ON) HCI event message and transfers it to the AP module 300 at operation 933. Also, at operation 935, the SE module 350 communicates data for processing a payment function to the external payment device 140 (i.e., the POS terminal, the NFC card reader) through a communication link (e.g., the NFC link). If a payment operation is finished, the SE module 350 releases a communication link with the external payment device 140 and transfers an HCI event associated with the release of the communication link to the AP module 300 at operation 937.

As discussed above, the electronic device includes the AP module 300 for processing an electronic payment application and the SE module 350 for performing a payment processing function by establishing a contactless communication link with an external payment device. The AP module 300 may update applets in the SE module 350 at a user's request, and the SE module 350 may send status information regarding applet update to the AP module 300 in an event driving manner. Therefore, the AP module 300 can transmit a command to the SE module 350 to update an applet in the SE module 350 without checking an applet update status.

Figure 10:
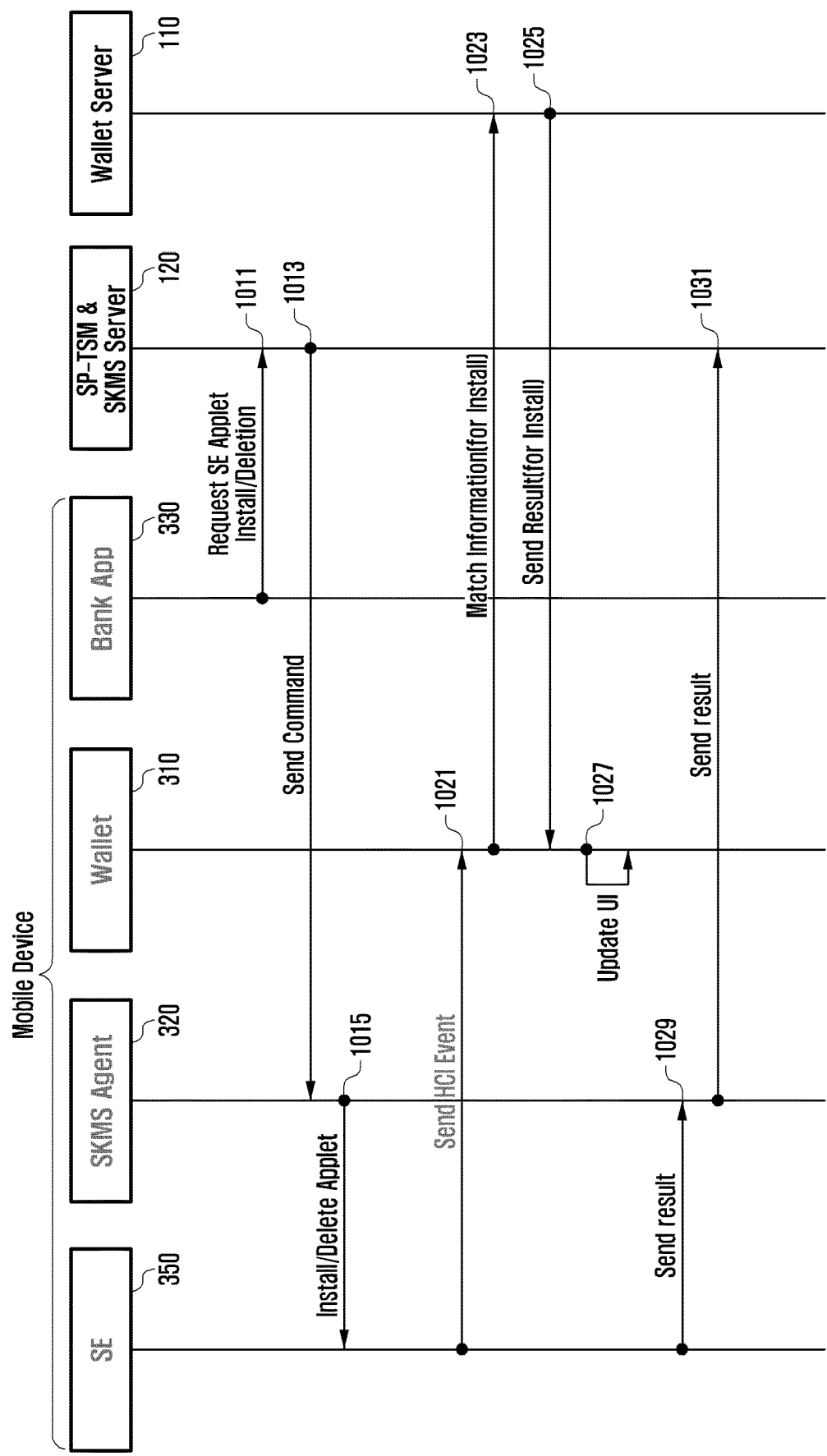
FIG. 10 is a flow diagram illustrating an example operation procedure of installing or deleting card information in or from an SE module in an electronic device having an electronic payment function.

FIG. 10 is a flow diagram illustrating an example operation procedure of installing or deleting card information in or from an SE module in an electronic device having an electronic payment function.

Referring to FIG. 10, when an applet install/deletion is requested from the input unit 240, the wallet module 310 of the AP module 300 sends it to the management server 120 through the first communication unit 220 at operation 1011. Then the management server 120 (e.g., the KMS server 127) sends a command for applet install/deletion of the SE module 350 to the electronic device. The KMS agent module 320 receives it at operation 1013 and sends it to the SE module 350 to install/delete applet at operation 1015. Then the SE module 350 updates (i.e., installs or deletes) applet of a corresponding electronic card. At operation 1021, the CRS module 360 of the SE module 350 sends an HCI event message including status information of applet update to the AP module 300. This HCI event message may be created in the form as shown in Table 1 and may contain status information caused by applet update.

Then the wallet module 310 may send applet update information of the electronic device to the wallet server 110 at operation 1023, and the wallet server 110 sends results to the wallet module 310 at operation 1025. Then the wallet module 310 updates a user interface of the AP module 300 according to applet update of the SE module 350 at operation 1027. Also, the SE module 350 sends results of applet update to the AP module 300 at operation 1029. The KMS agent module 320 of the AP module 300 sends the received results to the management server 120 (e.g., the KMS server) at operation 1031.

Figure 11:
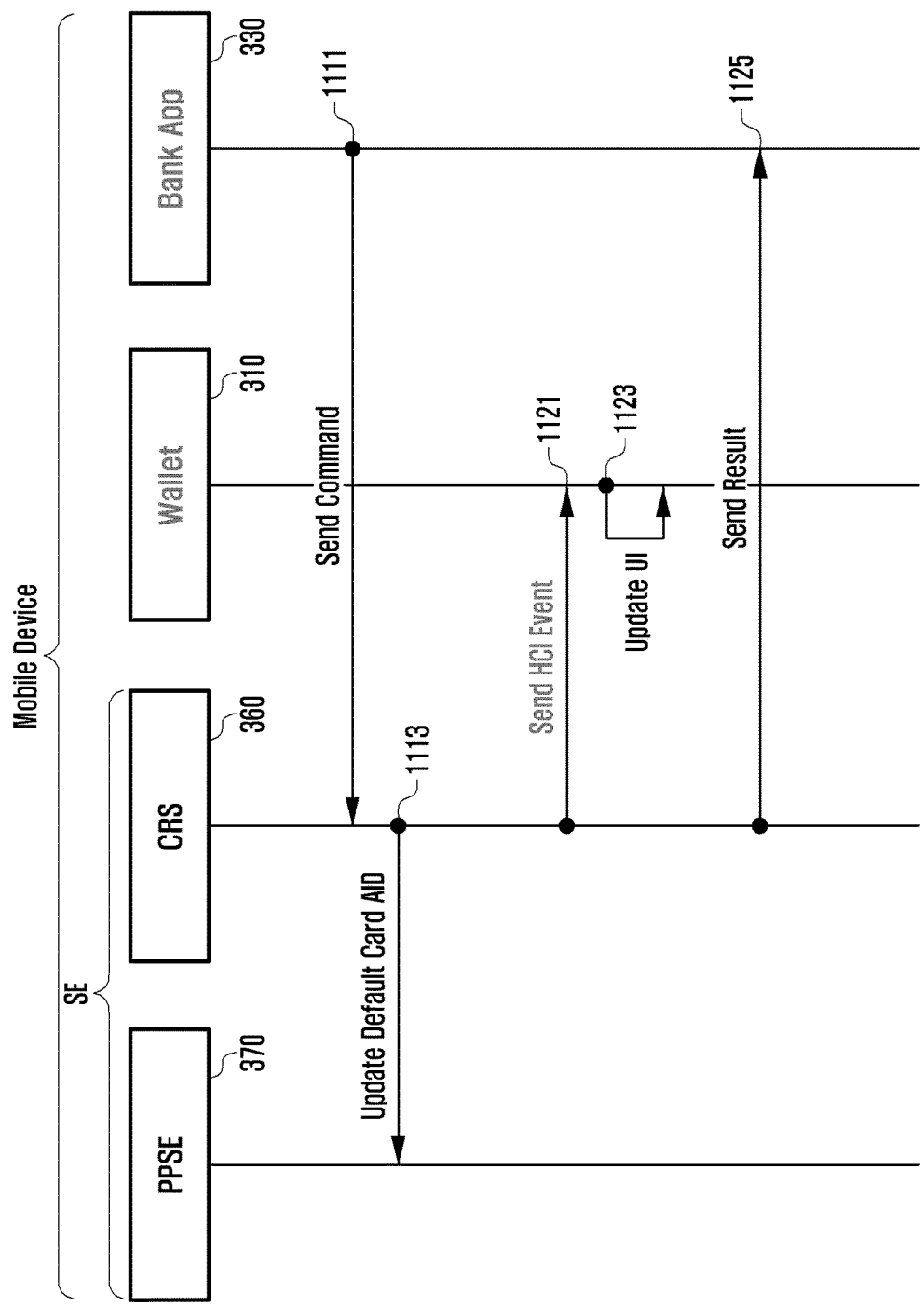
FIG. 11 is a flow diagram illustrating an example operation procedure of setting a payment card in an SE module in an electronic device having an electronic payment function.

FIG. 11 is a flow diagram illustrating an example operation procedure of setting a payment card in an SE module in an electronic device having an electronic payment function. This operation of setting a payment card is to change a default card, for example.

Referring to FIG. 11, when a change of a default payment card is requested from the input unit 240, the AP module 300 sends a command for changing a default payment card to the SE module 350 at operation 1111. Then the CRS module 360 of the SE module 350 receives it at operation 1111 and sends information about a corresponding card to the PPSE module 370 at operation 1113. At this time, such information may include default card AID. Then the PPSE module 370 of the SE module 350 may change and set the default payment card. Thereafter, at operation 1121, the CRS module 360 of the SE module 350 sends, to the AP module 300, an HCI event message containing status information according to a change of the default payment card.

Then the wallet module 310 receives it at operation 1121 and updates a user interface of the AP module 300 in response to a change of the default payment card of the SE module 350 at operation 1123. Also, at operation 1125, the wallet module 310 performs an update procedure and then notifies results to a corresponding bank application.

Figure 12:
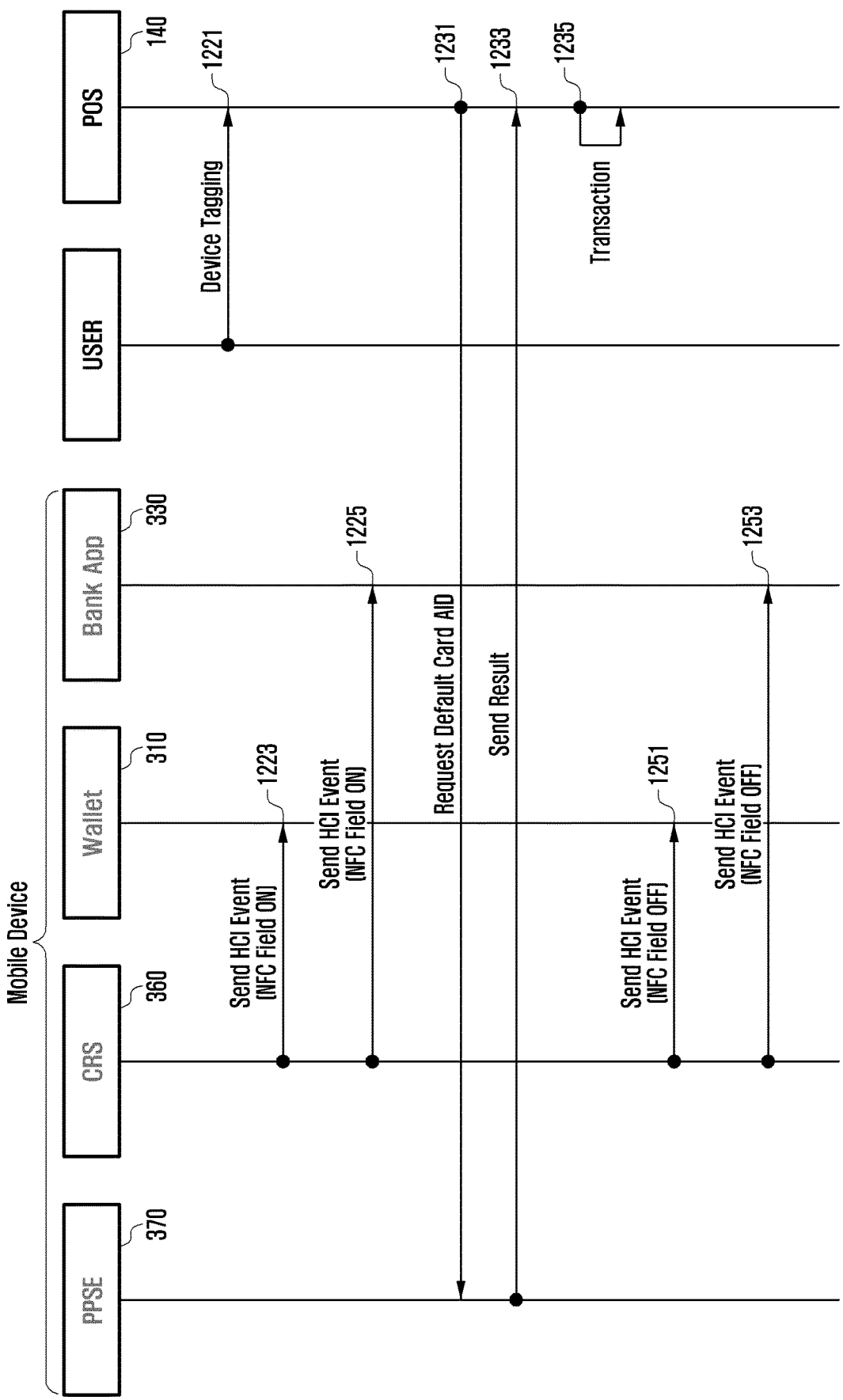
FIG. 12 is a flow diagram illustrating an example procedure of executing a payment operation with an external payment device in an electronic device.

FIG. 12 is a flow diagram illustrating an example procedure of executing a payment operation with an external payment device in an electronic device.

Referring to FIG. 12, when the electronic device 100 is tagged on the external payment device 140 at operation 1221, the CRS module 360 of the SE module 350 sends an HCI event (NFC field ON) indicating a communication link ON to the wallet module 310 of the AP module 300 at operation 1223 and also sends this HCI event to the bank application (e.g., the bank application of the default payment card) of the AP module 300 at operation 1225.

Thereafter, at operation 1231, the external payment device 140 requests default payment card information (e.g., default card AID) to the PPSE module 370. Then, at operation 1233, the PPSE module 370 sends such information to the external payment device 140. Thereafter, the PPSE module 370 of the SE module 350 and the external payment device 140 (the POS terminal) may perform a payment processing transaction at operation 1235.

After the payment processing transaction is finished, the CRS module 360 of the SE module 350 sends an HCI event (NFC field OFF) indicating a communication link OFF to the wallet module 310 of the AP module 300 at operation 1251 and also sends this HCI event to the bank application (e.g., the bank application of the default payment card) of the AP module 300 at operation 1253.

As discussed previously, if the electronic device having the electronic payment function updates information, for example, or if a specific application (such as a bank application, etc.) updates applet data in the SE module, an event regarding updated matters is transferred to other related applications including the specific application. Therefore, by using updated applet information in the SE module, the electronic payment applications can offer related information to a user at a suitable time.

While this disclosure has been particularly shown and described with reference to an example embodiment thereof, it will be understood by those skilled in the art that various changes in form and details may be made therein without departing from the disclosure as defined by the appended claims.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for" compliance with 35 U.S.C. § 101.

What is claimed is:

1. An electronic device comprising:
 a communication unit configured to communicate with an external payment device;
 a display unit configured to display information for a payment process to the external payment device; and
 a control unit including an application process module and a secure element module, wherein the application process module and the secure element module run distinct operating systems and are in communication with each other via a host controller interface (HCI),
 the control unit being configured to:
  transmit, from the secure element module to the application process module, a message regarding a tagging of the electronic device on the external payment device via the HCI,
  detect, via the application process module, an applet update request event corresponding to at least one electronic card among one or more electronic cards,
  transmit, in response to the detection of the applet update request event, update information corresponding to the at least one electronic card to the secure element module,
  update, via the secure element module, card information corresponding to the at least one electronic card based on the update information,
  transmit, from the secure element module to the application process module, the updated card information corresponding to the at least one electronic card after updating the card information via the same HCI, and
  update, via the application process module, an application corresponding to the at least one electronic card based on the transmitted updated card information,
 wherein the applet update request event corresponds to at least one of an installation of the at least one electronic card, a deletion of the at least one electronic card, a set of a default card, and a set of a temporary card.

2. The electronic device of claim 1, wherein the control unit is further configured to:
 transmit, via the application process module, a request for the installation of the at least one electronic card or the deletion of the at least one electronic card to the secure element module,
 install or delete, via the secure element module, a card applet corresponding to the at least one electronic card in response to the request for installation or deletion, transmit an installation or deletion event indicating a result of the installing or deleting corresponding to the card applet to the application process module, and update, via the application process module, the application corresponding to the at least one electronic card in response to the installation or deletion event indicating the result received from the secure element module.

3. The electronic device of claim 1, wherein the control unit is further configured to:

transmit, via the application process module, a request to set the default card to the secure element module, set, via the secure element module, a card applet as the default card in response to the request to set the default card, transmit a default card setting event indicating a result of setting the card applet to the application process module, and update, via the application process module, the application corresponding to the card applet in response to the default card setting event received from the secure element module.

4. The electronic device of claim 1, wherein when the tagging on the external payment device is detected, the control unit is configured to:

transmit, via the secure element module, a communication unit ON event to the application process module via the HCI, transmit payment card information to the external payment device, and execute the payment process, and transmit, via the secure element module, a communication unit OFF event to the application process module when the payment process is completed.

5. The electronic device of claim 1, wherein the secure element module includes:

the card information corresponding to the at least one of the one or more electronic cards, which comprises a payment function for the payment process;

a proximity payment system environment (PPSE) module configured to manage an applet corresponding to one of the one or more electronic cards and to transmit card information for the one of the one or more electronic cards to the external payment device via the communication unit; and a contactless registry service (CRS) module configured to control applets of the secure element module, update the card information corresponding to the at least one electronic card in response to receiving the update information from the application process module, and generate and transmit the updated card information to the application process module.

6. The electronic device of claim 1, wherein the application process module includes:

at least one application configured to execute at least one of installation, deletion or payment for the at least one electronic card;

a wallet module configured to control the display unit to display the one or more electronic cards of the secure element module and to enable selection of one of the displayed one or more electronic cards as a payment card; and a key management system (KMS) agent module configured to manage access for updating applets corresponding to the one or more electronic cards of the secure element module.

7. The electronic device of claim 6, wherein the control unit is further configured to:

control, via the wallet module, the display unit to display a list of the one or more electronic cards in the payment process to the external payment device, and in response to detecting selection of a specific card of the one or more electronic cards, control, via the wallet module, the display unit to display at least one of a card image, a card name, detailed information, and a link of a card company application corresponding to the selected specific card.

8. The electronic device of claim 6, wherein the control unit is further configured to control, via the wallet module, the display unit to display a list of the one or more electronic cards and to set a specific card selected from the list as a default payment card.

9. The electronic device of claim 6, wherein the communication unit is a near field communication (NFC) module that executes contactless communication with the external payment device.

10. The electronic device of claim 6, wherein the communication unit includes a long term evolution (LTE) and/or wireless fidelity (WiFi) communication unit connected with external servers through a communication network, and a near field communication (NFC) module that executes contactless communication with the external payment device.

11. A method for processing payment in an electronic device, the electronic device including an application process module and a secure element module that run distinct operating systems and are in communication with each other via a host controller interface (HCI), and the method comprising:

transmitting, from the secure element module to the application process module, a message regarding a tagging of the electronic device on an external payment device via the HCI;

detecting, via the application process module, an applet update request event corresponding to at least one electronic card among one or more electronic cards;

transmitting, via the application process module, update information corresponding to the at least one electronic card to the secure element module;

updating, via the secure element module, card information corresponding to the at least one electronic card based on the update information;

transmitting, from the secure element module to the application process module, the updated card information corresponding to the at least one electronic card after updating the card information via the same HCI; and updating, via the application process module, an application corresponding to the at least one electronic card based on the updated card information, wherein the applet update request event corresponds to at least one of an installation of the at least one electronic card, a deletion of the at least one electronic card, and a set of a default card.

12. The method of claim 11, further comprising:

transmitting, via the application process module, a request for the installation of the at least one electronic card or the deletion of the at least one electronic card to the secure element module, executing, via the secure element module, at least one of installing or deleting a card applet corresponding to the at least one electronic card in response to the applet update request, transmitting an installation or deletion event indicating a result of the at least one installing or deleting corresponding to the card applet to the application process module, and updating, via the application process module, the application corresponding to the at least one electronic card in response to receiving the installation or deletion event.

13. The method of claim 12, further comprising:
transmitting, via the application process module, the applet update request to a key management system (KMS) server; and in response to receiving an installation or deletion command from the KMS server, transmitting the installation or deletion command to the secure element module to cause the secure element module to execute the installation or deletion command.

14. The method of claim 13, wherein the updating by the application process module further comprises:
transmitting, via the application process module, a request for matching information of a corresponding card to a wallet server in response to receiving the installation or deletion event; and updating, via the application process module, a user interface of the application by utilizing a matching result received from the wallet server.

15. The method of claim 11, wherein when the applet update request comprises setting a default card, the method further comprises:
transmitting, via the application process module, a request to set the default card to the secure element module, setting, via the secure element module, a card applet as the default card in response to the applet update request, transmitting a default card setting event indicating a result of the setting to the application process module, and updating, via the application process module, the application corresponding to the card applet in response to the default card setting event.

16. The method of claim 15, wherein transmitting, via the application process module, the request for setting the default card to the secure element module further comprises:
displaying a list of the one or more electronic cards and a default card item indicating the default card from among the list; and when a particular electronic card that is not indicated by the default card item is selected from the list, transmitting the request to set the default card as the selected particular electronic card to the secure element module.

17. The method of claim 11, further comprising:
executing, via the secure element module, a payment process to the external payment device through a communication unit of the electronic device, wherein executing the payment process further comprises:
establishing, via the communication unit, a communication link between the secure element module and the external payment device when the tagging of the electronic device on the external payment device is detected;

transmitting, via the secure element module, a communication link ON event to the application process module;

transmitting, via the secure element module, card information of a default card among the one or more electronic cards to the external payment device;

executing the payment process with the external payment device using the card information; and releasing, via the secure element module, the communication link and transmitting, via the secure element module, a communication link OFF event to the application process module when the payment process is completed.

18. The method of claim 17, wherein the communication link comprises a near field communication (NFC) link.

19. The electronic device of claim 1, wherein the updated card information is transmitted as an EVT_TRANSACTION event according to ETSI Technical Specification TS 102 622 for Smart Cards, UICC—Contactless Front-end (CLF) Interface, and Host Controller Interface (HCI).

20. The electronic device of claim 1, wherein the control unit is further configured to:
when the applet update request event corresponds to the installation of the at least one electronic card or the deletion of the at least one electronic card, transmit, via the application process module, the applet update request event to an external server, receive, via the application process module, a command regarding the applet update request event from the external server, and transfer the command from the application process module to the secure element module; and when the applet update request event corresponds to the set of the default card, directly transfer the applet update request event from the application process module to the secure element module.

\* \* \* \* \*